Feb. 21, 1928. 1,659,888
A. J. MICHAUD
WHEEL JACK
Filed May 16, 1927 2 Sheets-Sheet 1
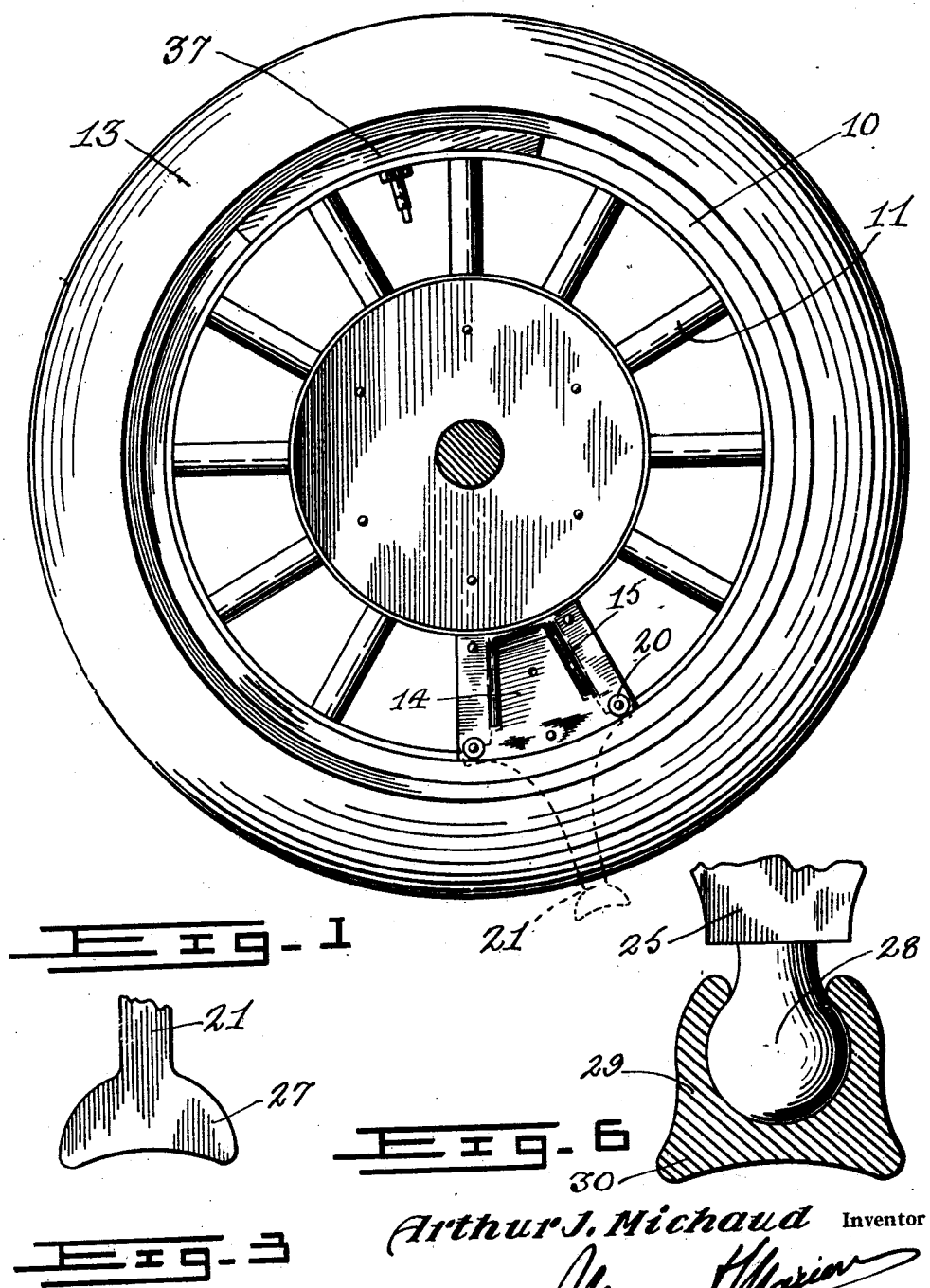

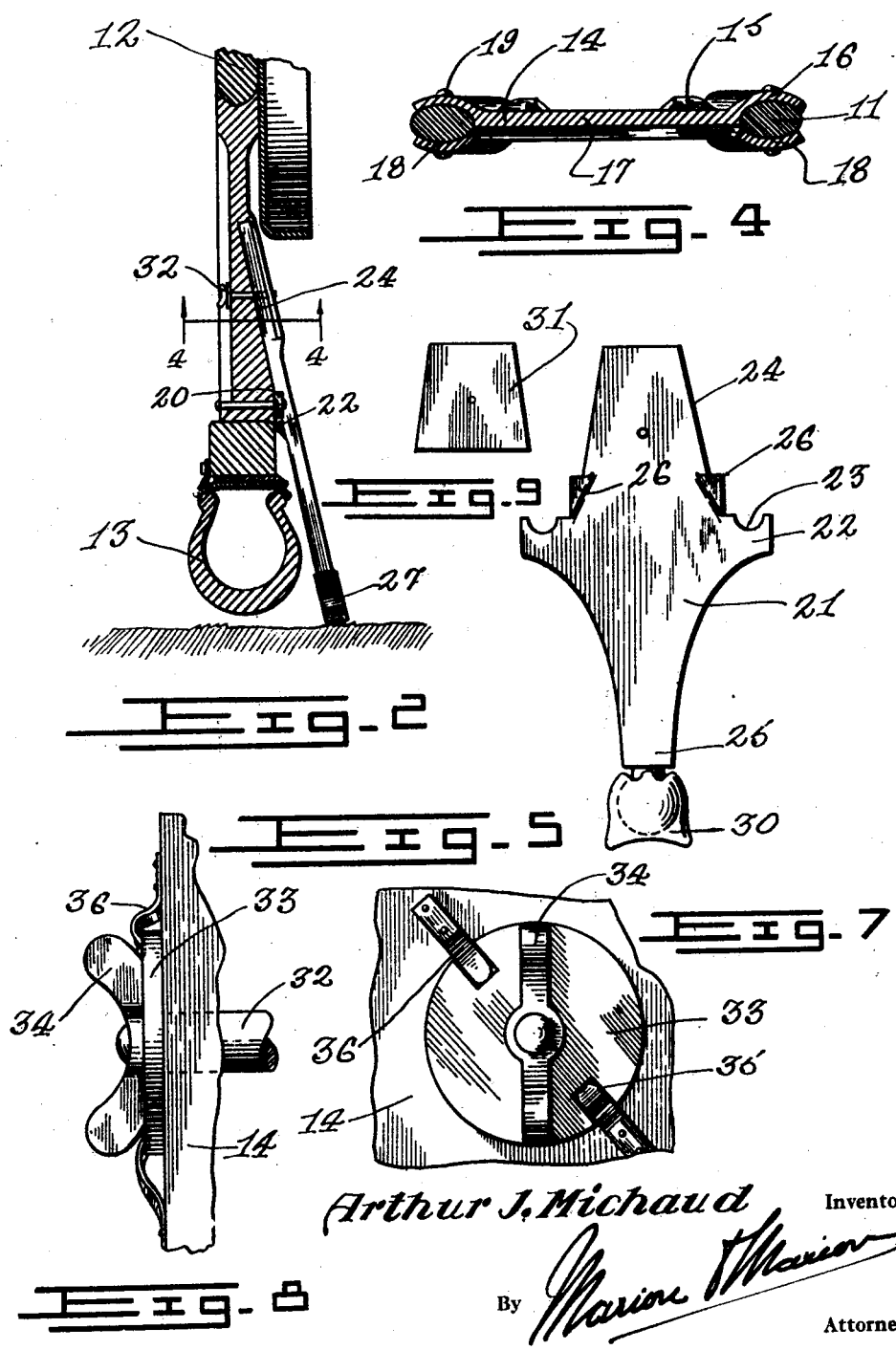

Patented Feb. 21, 1928.

1,659,888

UNITED STATES PATENT OFFICE.

ARTHUR JOSEPH MICHAUD, OF MONTREAL, QUEBEC, CANADA.

WHEEL JACK.

Application filed May 16, 1927. Serial No. 191,744.

The present invention relates to vehicle elevating devices and has particular reference to an improved type of wheel supporting jack.

An important object of the invention is the provision of a rigid jack which will assume an operative jacking position by the travelling movement of an automobile or similar vehicle.

Another object of the invention is the provision of a relatively simple device which can be employed to elevate several wheels of a vehicle simultaneously.

Still another object of the invention is the provision of a vehicle supporting device which will be rigidly connected to the wheel and thus prevent accidental displacement.

Another object of the invention is the provision of a wheel jack designed to be efficiently employed in elevating the wheels of a vehicle upon a slippery or yielding road surfaces.

A further object of the invention is the provision of a jacking device of the above character which is simple and durable of construction and which will be efficient in use.

Other objects and advantages of the invention will become apparent as the description progresses.

In the accompanying drawing forming a part of this specification and in which like reference characters are employed to designate corresponding parts throughout the same:

Figure 1 is a side elevational view of a conventional automobile wheel with my improved device associated therewith, Figure 2 is an enlarged vertical transverse sectional view through a wheel showing the preferred form of the device in operative position, Figure 3 is an enlarged fragmentary elevational view of the base portion of the preferred form of the invention, Figure 4 is an enlarged transverse sectional view taken on the line 4—4 of Figure 2, Figure 5 is a side elevational view of a modified form of jacking device, Figure 6 is an enlarged fragmentary elevational view partly in section of the ground engaging portion of the modified form of structure, Figure 7 is a side elevational view of a securing element, Figure 8 is an edge view of the same, and Figure 9 is a side elevational view of a cover plate employed to cover the supporting structure when the jack is not in use.

Referring to the drawings, wherein for the purpose of illustration are shown a preferred and a modified form of my invention, the numeral 10 designates the felly of a conventional automobile wheel to which are connected at spaced intervals radial spokes 11. The inner ends of the spokes are connected with a circular hub 12 while the outer periphery of the felly carries a rim and tire structure 13. It will of course be obvious, that this wheel is of conventional construction and forms no part of my invention being merely illustrated to designate the application of my improved jacking device in association with the common forms of vehicle wheels.

With particular reference to the structure of my invention, the numeral 14 designates a support frame adapted to be rigidly attached to and permanently carried by each wheel of the vehicle. This frame is provided with a grooved flange 15 adapted to form a detachable socket for a support jack. The support frame is preferably formed from a durable metallic plate having a segmental contour. The radial edges of the plate are bent transversely to conform to the interior contour of the spokes as shown at 16 while the main body portion of the plate 17 extends arcuately between two adjacent spokes. In order that the frame 14 may be durably connected with the spokes of the wheel, a pair of longitudinal transversely curved protecting plates 18 are positioned against the outer sides of the spokes in opposed arrangement to the curved plate portions 16. Transversely extending bolts 19 are projected through openings in the spokes and the curved plate sections 16 and plates 18 so that the frame is firmly secured to two adjacent spokes as shown to advantage in Figure 1. In this connection, it will be noted that the two bottom bolts 19 are extended inwardly to firmly engage circular collars 20 the purpose of which will be apparent as the description progresses.

As clearly illustrated in Figures 2 and 4, the intermediate body portion of the frame is formed to provide an inner inclined surface about which is formed a continuous substantially V-shaped flange 15, this flange being formed with an undercut groove to form a tapered socket for the engagement of a jack member.

The jack member embodies a longitudinally elongated body 21, its intermediate portion being of relatively wide formation and formed to provide a pair of laterally projecting shoulders 22, the upper edges of which are recessed to provide semi-circular bearings 23. The upper portion of the jack is formed with a diminishing taper toward the upper end so that the side edges are formed at a straight angular inclination as at 24 designed to be slidably fitted in the socket flange 15. The lower end of the jack is also formed with a diminishing taper having a relatively narrow bottom end portion 25. As shown to advantage in Figure 5, the lower end portions of the inclined side edges 24 are formed with angular projections 26 adapted to engage the lower edges of the socket flange 15 to form a support.

As shown to advantage in Figure 3, the preferred form of jack member is formed with a crescent shaped foot 27 adapted to frictionally engage the surface of the ground.

With reference to Figure 6, wherein a modified form of structure is illustrated, a ball section 28 is rigidly secured to the lower end of the jack and is mounted for universal movement in a socket 29, the lower portions of which are found to provide a pair of corner projections 30.

When the jack members 21 are not in use, they are carried in the car and the socket forming flange 15 is covered by a cover plate 31 formed to be tightly fitted upon the flange to prevent the collection of dirt within the groove formed in the flange. This cover plate 31 is firmly held in position by a removable bolt 32 which is threaded at its rear end for engagement with a nut 33. This nut preferably embodies a circular plate formed with transversely extending wings 34, the centre of the nut being interiorly screw threaded for engagement with the bolt 32. The outer surface of the nut 33 is formed with diametrically opposed slots 35 engageable with spring clips 36 secured to the outer side of the support frame. From this construction it is apparent that the nut 33 can be adjustably connected with the outer end of the bolt 32 and locked against accidental displacement. In this connection, it will be noted that the bolt 32 and nut 33 are employed to firmly connect the jack member 21 with the support frame.

In use, when it is desired to elevate any wheel of an automobile or similar vehicle, the jack member 21 is attached to the support frame 14, the upper tapered end of the jack being slidably fitted in the undercut groove formed in the flange 15 and secured in position by the bolt 32. The upper projections 26 will engage the outer ends of the flange and the bearing recesses 23 will bear opposed the collars 20 so as to durably support the vehicle. The jack member is attached to the wheel in a radial position immediately in advance of its subsequent movement and as the vehicle is propelled the lower foot portions of the jack will frictionally engage the ground and elevate the wheel.

The preferred form of foot structure embodies an exceedingly simple and durable member which will positively engage the ground and support the wheel in elevated position. The modified form shown in Figure 6, embodies a more costly construction and it is arranged so that the socket will be properly positioned on the ground prior to the elevation of the wheel so that the final elevation of the wheel is effected by the movement of the ball joint 28. To preserve the balance of the wheel, a counterweight 37 is disposed diametrically opposite the support frame 14, and attached to the felly 10 above the inner-tube's air valve.

The present construction provides a simple and inexpensive wheel elevating device which will securely support any of the wheels in elevated position for the correction of tire trouble.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus fully described my invention, I claim:

1. A wheel jacking device comprising, in combination, a segmental support plate adapted to be secured to two adjacent spokes of the wheel, a flange formed upon the side of the plate forming a tapering socket, and a jack member slidably engageable with the plate socket adapted to extend radially beyond the peripheral edge of the wheel tire to support the wheel in elevated position.

2. A wheel jacking device comprising, in combination, a segmental support frame including a plate formed with curved edge portion adapted to be rigidly secured to two adjacent spokes of a wheel, a flange provided with an undercut groove formed on one side of the plate to form a tapered socket, and a longitudinal jack member having one end tapered for slidable connection with the frame socket and the outer end formed to engage the surface of the ground, the said outer end of the jack being formed to project beyond the periphery of the wheel to support the wheel in elevated position when the jack is arranged in vertical downward position.

3. In combination with a vehicle wheel including a plurality of radially extending spokes, a wheel jacking means including a segmental plate adapted to be secured to the wheel spokes, a continuous flange formed on the plate having an undercut groove and arranged to form a socket tapering toward its inner end, a jack member having its inner end formed for slidable engagement with the socket and extending radially beyond the peripheral edge of the wheel, and a ground engaging foot formed on the outer extremity of the jack member.

4. In combination with a vehicle wheel including a plurality of radially extending spokes, a wheel jacking means including a segmental plate adapted to be secured to the wheel spokes, a continuous flange formed on the plate having an undercut groove and arranged to form a socket tapering toward its inner end, a jack member having its inner end formed for slidable engagement with the socket and extending radially beyond the peripheral edge of the wheel, a ground engaging foot formed on the outer extremity of the jack member and including a ball joint secured to the outer end of the jack member and a socket mounted for universal movement upon the ball joint frictionally engageable with the ground to support the wheel in elevated position.

In witness whereof I have hereunto set my hand.

ARTHUR JOSEPH MICHAUD.